J. E. PARKER AND D. B. WINTER.
MEANS FOR ATTACHING ELECTRICAL APPLIANCES TO CONDUIT OUTLET BOXES.
APPLICATION FILED JULY 30, 1915.
1,310,578.
Patented July 22, 1919.
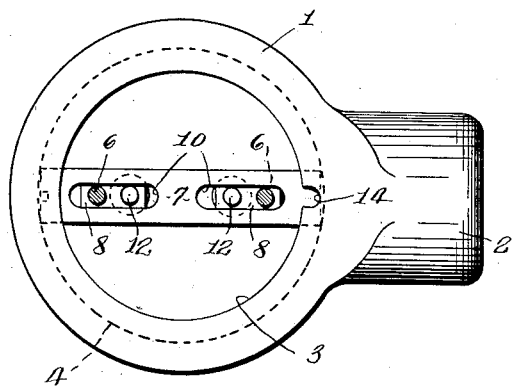
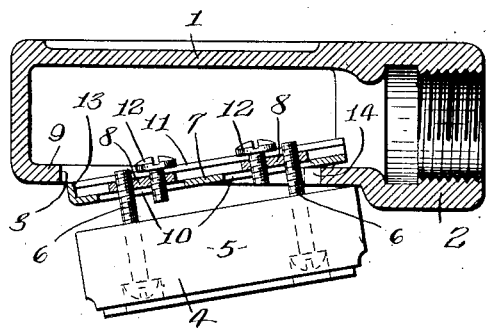
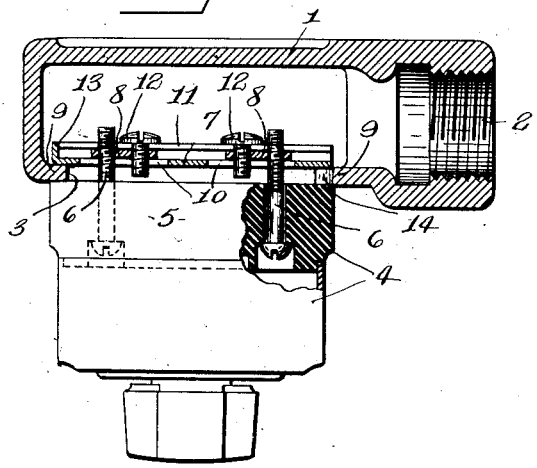
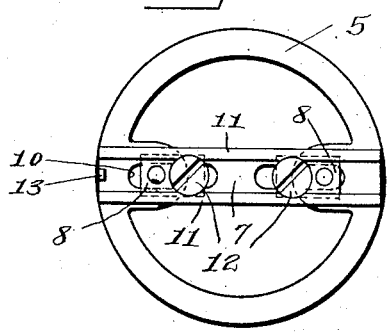
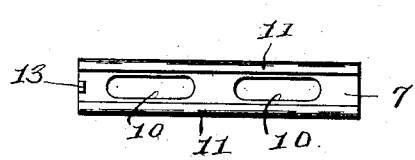
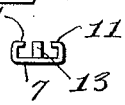
WITNESSES:
CCSchorneck
Chas H Young
INVENTORS.
John E. Parker
BY Daniel B. Winter
Parsons + Bodell
ATTORNEYS.

UNITED STATES PATENT OFFICE.

JOHN E. PARKER AND DANIEL B. WINTER, OF SYRACUSE, NEW YORK, ASSIGNORS TO CROUSE-HINDS COMPANY, OF SYRACUSE, NEW YORK, A CORPORATION OF NEW YORK.

MEANS FOR ATTACHING ELECTRICAL APPLIANCES TO CONDUIT OUTLET-BOXES.

1,310,578. Specification of Letters Patent. Patented July 22, 1919.

Application filed July 30, 1915. Serial No. 42,726.

*To all whom it may concern:*

Be it known that we, JOHN E. PARKER and DANIEL B. WINTER, citizens of the United States, and residents of Syracuse, in the county of Onondaga and State of New York, have invented a certain new and useful Means for Attaching Electrical Appliances to Conduit Outlet-Boxes, of which the following is a specification.

This invention has for its object means for attaching electrical appliances, as snap switches having fastening screws spaced different distances apart, to conduit outlet boxes having openings which are closed by the electrical appliances, that is, over which said appliances are mounted; and the invention consists in the novel features hereinafter set forth and claimed.

In describing this invention, reference is had to the accompanying drawings, in which like characters designate corresponding parts in all the views.

Figure 1 is a cross-sectional view through the assembled box and switch attaching means, showing in plan one form of conduit outlet box with the attaching means in position, the fastening screws of the electrical appliance being shown in section.

Fig. 2 is a longitudinal sectional view through the box and attaching means showing the operation of the attaching means after being attached to the base of the electrical appliance as a switch, and when being placed in position in the box, one end of the said means being shown as inserted in the box and the other as about to be placed in position in the box.

Fig. 3 is a longitudinal sectional view through the box and attaching means, a snap switch being shown partly in section mounted on the box.

Fig. 4 is an inverted plan view of the base of a switch to which the attaching means is secured.

Figs. 5 and 6 are, respectively, a plan and an end elevation of the bar of the fastening means.

1 designates the conduit outlet box which may be of any suitable form, size and construction, this box having means as an internally threaded nipple 2 for connection with the electrical conduit in which the feed wires are located and having an opening 3 in one wall thereof.

The electrical appliance is here shown as a snap switch 4 including a base 5 which is provided with fastening screws 6. In different sizes and makes of switches, these screws are spaced different distances apart, and the attaching means here shown is constructed to be standard to different sizes and makes of switches.

The means for attaching the snap switches to the conduit outlet box includes a bar 7 bent up out of a strip of metal in the form of a channel, and means, as nuts 8, slidably fitting in the channel and adjustable lengthwise of the bar into such position that their threaded holes are in alinement with the fastening screws 6 of the particular switch to which the attaching means is being applied. The bar 7 is here shown as of greater length than the diameter of the hole 3 in order that when the bar is in position, its end portions will bear against the inner face of the wall 9 around the opening 3. The bar 7 is here shown as arranged with the bottom of its channel against the margin of the wall 9 and as having slots 10 in its bottom through which the fastening screws 7 extend. The bar also has the margins 11 of its sides overhanging the bottom of the channel in order to hold the nuts 8 from falling out of the channel through the open side thereof, and also to form a bearing for the heads of screws 12 threading into additional openings in the nuts and serving to clamp the nuts in any adjusted position lengthwise of the bar. The nuts 8 are placed in the channel bar through one end thereof which is open and the other end of the bar is formed with an abutment or tongue 13 arranged to prevent the nuts from sliding out through said end.

In operation, the nuts 8 are first spaced the required distance apart and held from movement by turning the screws 12, and the bar is then mounted on the screws 6 of the electrical appliance, the screws being turned but partly through the nuts. One end of the bar so attached to the electrical appliance is then inserted under the margin of the wall around the opening 3, as shown in Fig. 2, and lapped on said margin as far as the screw 6 adjacent said end will permit, and the other end of the bar is then moved inwardly through the opening 3 across the edge of the margin 9 until it clears the margin 9, whereupon the electrical appliance or the base thereof is again moved to shift the bar endwise in the opposite direction so that both ends thereof engage the inner face of the margin 9. The screws 6 are then tightened.

In order that the bar may be made sufficiently short for comparatively small openings, and long enough for the larger openings, the margin of the wall 9 is formed with a notch 14, and in placing in position a bar with a switch base attached, the screws 6 of which base are spaced a comparatively great distance apart, the screw 6 nearest the end, which is first inserted under the margin 9, enters the notch 14 so that the opposite end of the bar can be moved farther toward the center of the opening than it could if the notch were not provided, the notch permitting said opposite end of the bar to clear the part of the margin 9 opposite the notch. Hence, this attaching means is adapted to secure a switch in which the screws are placed a comparatively wide distance apart onto a box having a comparatively small opening and is also adapted to secure a comparatively large switch base onto a comparatively large opening. Owing to the notch, the range of use of a bar 7 of a given size is greatly increased.

What we claim is:—

1. The combination with a conduit outlet box having an opening, and an electrical appliance mounted on the box and covering said opening, of means for connecting electrical appliances to the box comprising a bar of greater length than the diameter of the opening and having its ends arranged to engage the inner face of the margin of the wall around said opening, said bar having adjustable means for receiving the fastening screws of the electrical appliance, and means for holding the former means in its adjusted position, substantially as and for the purpose described.

2. The combination with a conduit outlet box having an opening and an electrical appliance mounted on the box and covering said opening and having fastening screws spaced apart; of means for connecting the appliance to the box including a bar in the form of a channel, the bar being of greater length than the diameter of the opening of the box so that its ends bear against the inner face of the margin of the wall around the opening, a non-circular nut slidably fitting in the channel of the bar and having its opening arranged to receive the fastening screw of the electrical appliance, and means for holding the nut in various positions along said bar, substantially as and for the purpose specified.

3. The combination with a conduit outlet box having an opening, and an electrical appliance mounted on the box and covering said opening and having fastening screws spaced apart; of means for connecting the appliance to the box including a bar in the form of a channel, the bar being of greater length than the diameter of the opening of the box so that its ends bear against the inner face of the margin of the wall around the opening, non-circular nuts slidably fitting in the channel of the bar and having their openings arranged to receive the fastening screws of the electrical appliance, and means for holding the nuts in various positions along said bar, substantially as and for the purpose set forth.

4. The combination with a conduit outlet box having an opening, and an electrical appliance mounted on the box and covering said opening and having fastening screws spaced apart; of means for connecting the appliance to the box including a bar in the form of a channel, the bar being of greater length than the diameter of the opening of the box so that its ends bear against the inner face of the margin of the wall around the opening, non-circular nuts slidably fitting in the channel of the bar and having their openings arranged to receive the fastening screws of the electrical appliance, the nuts also having additional threaded holes therein, and screws threading in the latter holes and having their heads arranged to clamp on the bar to hold the nuts in adjusted position, substantially as and for the purpose described.

5. The combination with a conduit outlet box having an opening, and an electrical appliance mounted on the box and covering said opening and having fastening screws spaced apart; of means for connecting the appliance to the box comprising a bar in the form of a channel, the sides of the channel having their margins turned inwardly in position opposed to the bottom of the channel, nuts slidably fitting in the channel and engaging the side walls thereof, each nut having a pair of threaded openings one of which receives a fastening screw of the electrical appliance, and a clamping screw threading in the other opening through the open side of the channel and having its head bearing on a portion of the bar, substantially as and for the purpose specified.

6. The combination with a conduit outlet box having an opening, and an electrical appliance mounted on the box and covering said opening and having fastening screws spaced apart; of means for connecting the appliance to the box comprising a bar in the form of a channel having a slot in the bottom of the channel, the sides of the channel having their margins turned inwardly in position opposed to the bottom of the channel, nuts slidably fitting in the channel, each nut having a pair of threaded holes, one hole being arranged to receive one of the fastening screws of the electrical appliance through the slot, and clamping screws extending through the open side of the channel bar into the other threaded hole of the nut and having their heads arranged to clamp against the margins of the sides of the channel bar, substantially as and for the purpose set forth.

7. The combination with a conduit outlet box having an opening, and an electrical appliance mounted on the box and covering said opening and having fastening screws spaced apart; of means for connecting the appliance to the box, said means comprising a bar in the form of a channel, a nut slidably fitting the channel and having a threaded opening for receiving the fastening screw of the electrical appliance, and means for clamping the nut at any point along the bar, substantially as and for the purpose described.

8. The combination with a conduit outlet box having an opening and a notch in the margin of the wall around the opening, and an electrical appliance having fastening screws spaced apart; of means for connecting the electrical appliance to the box, said means comprising a bar of greater length than the diameter of the opening whereby when inserted through the opening the ends thereof engage the inner face of said margin, and means associated with the bar for receiving the fastening screws of the electrical appliance, one of the fastening screws being movable into the notch after one end of the bar attached to said screws is moved into engagement with the inner face of said margin while the other end of the bar is being moved into the box across the edge of said margin, substantially as and for the purpose specified.

In testimony whereof, we have hereunto signed our names in the presence of two attesting witnesses, at Syracuse, in the county of Onondaga, and State of New York, this 20th day of May, 1915.

JOHN E. PARKER.
DANIEL B. WINTER.

Witnesses:
C. C. SCHOENECK,
WM. CORNELL BLANDING.